United States Patent

[11] 3,582,040

| [72] | Inventor | Daniel Gutierrez<br>Sabinos 058, Jardines de San Mateo, Mexico |
|---|---|---|
| [21] | Appl. No | 654,149 |
| [22] | Filed | July 18, 1967 |
| [45] | Patented | June 1, 1971 |
| [32] | Priority | July 19, 1966, Apr. 26, 1967 |
| [33] | | Mexico |
| [31] | | 90038 and 95477 |

[54] COCK VALVE
3 Claims, 19 Drawing Figs.

[52] U.S. Cl. ................................................. 251/287, 251/212, 251/182
[51] Int. Cl. ..................................................... F16k 5/06, F16k 5/20, F16k 25/100
[50] Field of Search .................................... 251/182, 185, 287, 286, 288, 312, 314, 316, 317

[56] References Cited
UNITED STATES PATENTS

| 99,943 | 2/1870 | Peet | 251/314 |
| 197,924 | 12/1877 | Crickmer | 251/182 |
| 262,935 | 8/1882 | Dibble | 251/317 |
| 2,018,034 | 10/1935 | Roberts | 251/287X |
| 2,274,731 | 3/1942 | Parker | 251/182 |
| 2,383,054 | 8/1945 | Franck | 251/286 |
| 2,711,185 | 6/1955 | Rhodes | 251/182X |
| 2,845,248 | 7/1958 | Fuglie | 251/317X |
| 3,241,809 | 3/1966 | Smith | 251/182 |

*Primary Examiner*—Harold W. Weakley
*Attorney*—Waters, Roditi, Schwartz & Nissen ABSTRACT: A cock valve comprising a cylindrical valve chamber completely closed at one end, and a composite plug within said chamber, said composite plug being provided with yieldable sealing means to seal against the cylindrical wall of the valve chamber, said plug having a diametral bore transverse to the length of said yieldable means to permit the flow of fluid through the valve in one position and to obstruct said flow in another position.

The open end of the valve chamber is sealed by valve cap forming a packing gland with the upper portion the plug which is provided with a stem extending outwardly of said valve cap to enable the operation of the valve by turning it to the proper position.

The yieldable sealing means comprise a solid body of an elastomeric material forming an insert in the plug, or a pair of elastomeric members biased outwardly of the plug by means of a spring device, or a hollow cylindrical member of an elastomeric material surrounding the plug and biased outwardly at a portion thereof by the spring means.

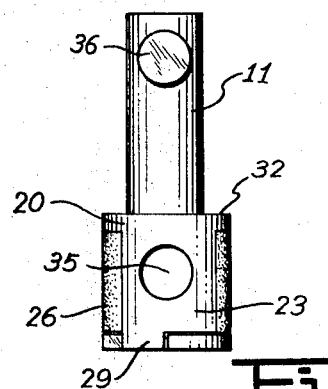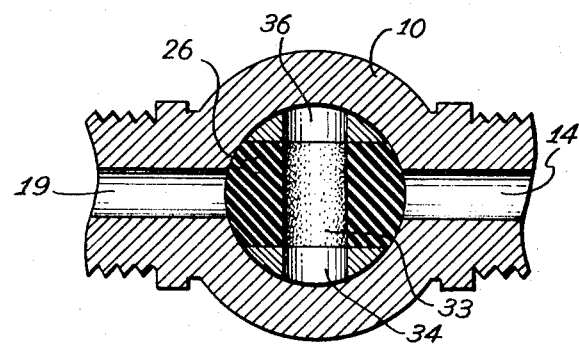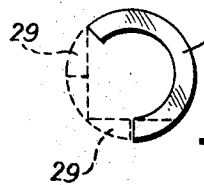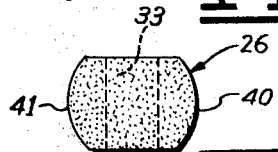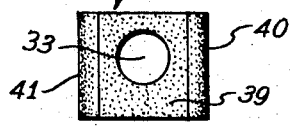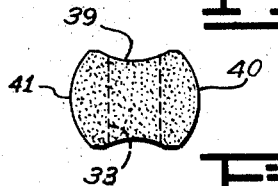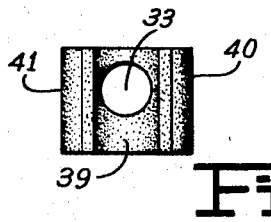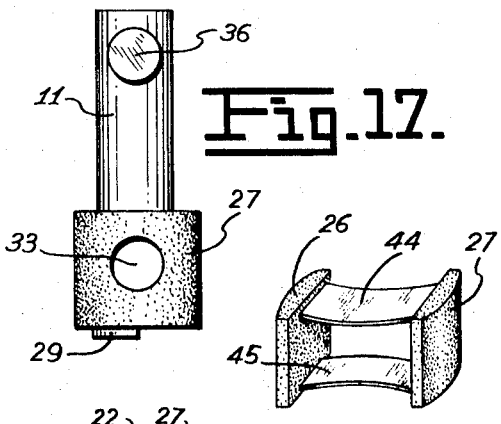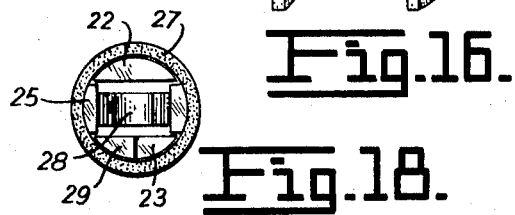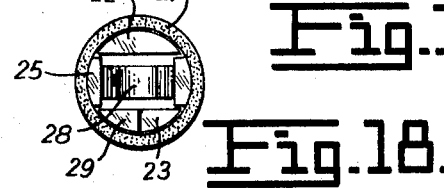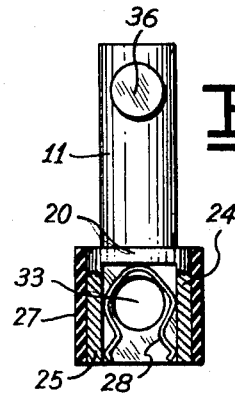

COCK VALVE

The open end of the valve chamber is sealed by a valve cap forming a packing gland with the upper portion of the plug which is provided with a stem extending outwardly of said valve cap to enable the operation of the valve by turning it to the proper position.

The yieldable sealing means comprise a solid body of an elastomeric material forming an insert in the plug, or a pair of elastomeric members biased outwardly of the plug by means of a spring device, or a hollow cylindrical member of an elastomeric material surrounding the plug and biased outwardly at a portion thereof by the spring means.

The present invention is related to cock valves and, more particularly, to a novel and improved cock valve having leakage proof characteristics, said cock valve also being of a very simple construction, installation and operation.

The problems caused by the prior art cock valves presently in use for controlling the flow of combustible gases such as liquefied petroleum gas, are well know. Said prior art valves comprise a frustoconical valve chamber with its two ends open, and a complementary frustoconical metal plug introduced within said chamber, with an intermediate thin layer of grease in order to obtain a leakage-proof seal between the two members. Therefore, said valves depend on the accuracy of the machining operations effected on both metal parts of the valve to achieve the production of two accurate complementary metal surfaces which by means of said thin layer of grease, will be able to provide a fluidproof seal.

The problems involved in the above-described conventional type of valves are many and, inter alia, the following ones can be enumerated as the most important: The accuracy of the machining operations for the valve must be very high if good results are to be expected, therefore, any mistreatment of the valves can cause the spoilage of the tight fit between the two members thereby permitting leakage of fluid outwardly of the valve; these valves must be used with a thin layer of grease between the two members to perform efficiently and this in itself constitutes a main disadvantage because they are generally operated by unskilled personnel who are not able to detect a failure in the operation and, finally, when these valves are used as stop valves for a liquefied gas installation, there is the danger that if the valve is mistreated, the gas can leak out of the pipe and form explosive mixtures which can be the cause of serious disasters. On the other hand, in this same type of installations, a pressure regulator is generally required at the exit of the tanks or of the pipelines so as to reduce the pressure of the liquefied gas to a pressure which can be withstood by the valves used in domestic appliances such as stoves, ranges, ovens, boilers and the like. However, if these pressure regulators accidentally burst, the gas pressure will be excessive and the commonly known cock valves will not be able to stop the flow of gas at this pressure, thereby being rendered useless under these conditions.

On the other hand, in all prior art cock valves, due to the fact that the seal is effected between two metal members with a minimum gap therebetween, when one of said members is damaged or marred, there is no other choice but to entirely replace the valve, since said valves must be used as units and do not provide for the replacement of parts thereof. In other words, if the plug is damaged because of mistreatment of the valve, it will not be possible to introduce another plug within the corresponding valve chamber, since the gap which may exist between both members must be very small and the change of one of the members cannot provide such a close tolerance.

Having in mind the defects of the prior art cock valves, it is an object of the present invention to provide a cock valve which will avoid all the above-mentioned drawbacks and which however will be of a very simple, economical and efficient in construction and operation.

Another object of the present invention is to provide a valve of the above-mentioned character, in which replaceable members will be provided and in which the sealing action will not depend on the cooperation between two metal parts, by the provision of a yieldable element to effect said seal.

A further and more particular object of the invention is to provide a valve of the above character, which will comprise yieldable means inserted in the plug thereof in order to effect the sealing operation of the valve under foolproof conditions, and which will have improved means for indexing and fixing the open and closed positions of the valve.

A further object of the invention is to provide a valve of the above-mentioned character, which will have spring means to bias the yieldable means toward the inner surface of the valve chamber so as to achieve a leakage-proof seal therebetween.

The invention, both as to its organization and its method of operation, together with additional objects and advantages thereof, will best be understood from the following description of specific embodiments thereof, when read in connection with the accompanying drawing, in which:

FIG. 4 is a cross-sectional view similar to FIG. 3 but showing the valve in the closed position;

FIG. 5 is an elevational view of the valve plug used with the valve built in accordance with the embodiment of FIG. 2;

FIG. 6 is a plan view of a positioning ring to fix the positions of the plug;

FIG. 7 is a plan view of a form of the yieldable element used in connection with the valve of this embodiment;

FIG. 8 is a side elevational view of the member shown in FIG. 7;

FIG. 9 is a plan view of another particularly preferred form of yieldable means in accordance with the invention;

FIG. 10 is a side elevational view of the member shown in FIG. 9;

FIG. 16 is a perspective view of still another embodiment of yieldable means in accordance with the invention;

FIG. 17 is an elevational view of a valve plug for a cock valve built in accordance with still another embodiment of the invention;

FIG. 18 is a bottom plan view of the plug shown in FIG. 17; and

FIG. 19 is a view similar to FIG. 17, but partially broken away to show inner details thereof.

Figure 1:
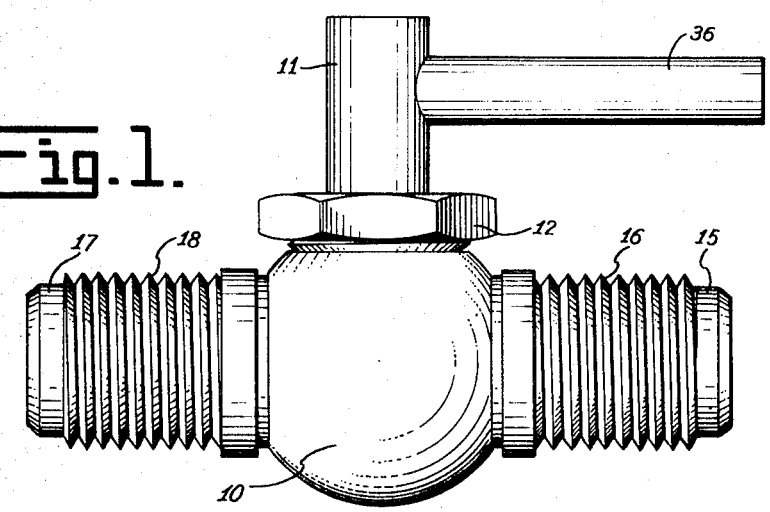
FIG. 1 is a side elevational view of a cock valve built in accordance with the present invention.

Having more particular reference to the drawings and still more specifically to FIGS. 1 through 8 thereof, there is shown a particularly preferred embodiment of a valve built in accordance with the invention, which comprises a valve body 10, preferably of spherical form, a valve stem 11, a valve cap 12 and a pair of inlet and outlet members 5 and 17, externally threaded as shown in 16 and 18. Within the valve body 10 there is provided a valve chamber 13 in the form of a cylindrical bore as more clearly illustrated in FIG. 2, in order to accommodate the cylindrical member or valve plug 20, integrally attached to the valve stem 11 which in turn carries a handle 36 of suitable type in order to provide a lever action for rotation thereof.

The inlet and outlet members of the valve in accordance with the present embodiment are axially bored as shown in 14 and 19, each of bores 14 and 19 being provided with a counterbore 37 and 38, respectively, opening toward the exterior of the valve.

Figure 2:
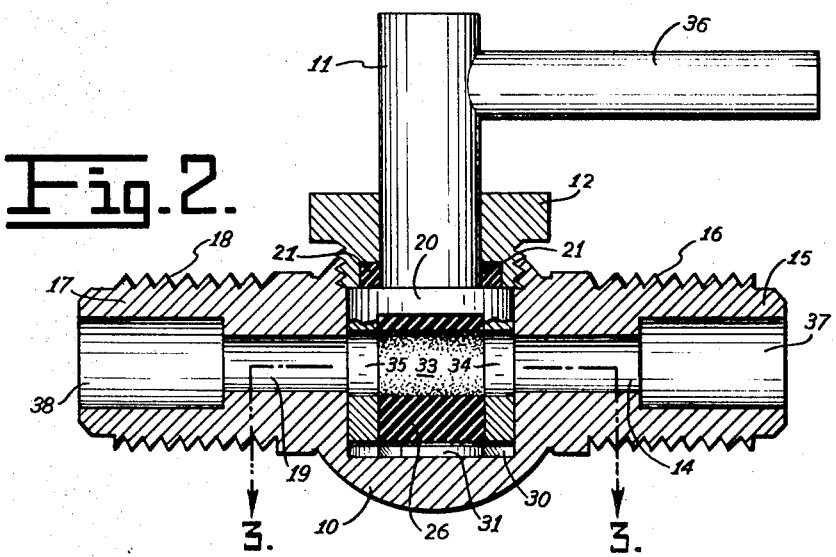
FIG. 2 is a cross-sectional side elevational view of a cock valve built in accordance with one of the embodiments of the invention, showing all the inner details thereof and illustrated in the open position.
Figure 3:
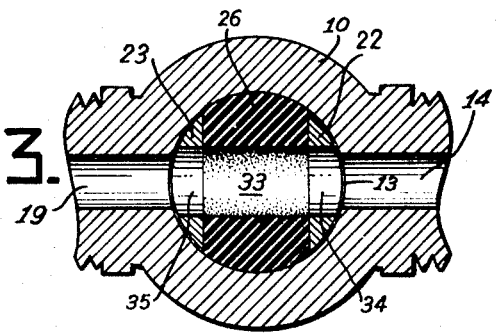
FIG. 3 is a cross-sectional view taken along lines 3-3 of FIG. 2 and looking in the direction of the arrows.

The plug or cylinder 20 of the cock valve according to the present invention is built as a cylindrical member with an undercut at the center thereof in order to form a bifurcated portion providing two arms 22 and 23 such that between said arms a cavity will be provided in which a yieldable elastomeric member 26 is inserted to serve as a sealing member for the valve. Both arms 22 and 23 of plug 20 are provided with bores 34 and 35, respectively, and the sealing member 26 is also provided with a diametral bore 33, to thereby allow the free passage of the fluid from one of the bores 14 and 19 toward the other bore, when the valve is in its open position as shown in FIGS. 2 and 3. In the open position of the valve, all the bores 33, 34, and 35 will be aligned and will register with the bores 14 and 19 of the inlet and outlet members 15 and 17 of the valve, thus providing an unobstructed path for the fluid from one end of the valve to the other.

The structure of the cylinder or plug of the valve built in accordance with the present embodiment is more fully illustrated in FIG. 5 of the drawings, which shows that at least one of the arms 22 or 23, in this particular case arm 23, is provided with a downwardly extending tab 29 to serve as a stop which fixes the open and closed positions of the valve as will be more fully described hereinbelow. The sealing member 26 is inserted within the cavity formed between arms 22 and 23 and abuts against the upper portion of said cavity of plug 20, the lower surface of said member extending down to the ends of each one of the arms 22 and 23.

The sealing member 26 can adopt a diversity of shapes and structures, but it is preferably built such that both ends thereof are rounded as shown at 40 and 41, said rounded ends having a contour following the curvature of the valve chamber, while its intermediate rectangular portion adapts to the cavity formed between arms 22 and 23 of plug 20. The height of the sealing member 26 is such that its upper edge will be firmly seated against the upper portion of the cavity of cylinder 20 and its lower portion will be flush with a ring 30 placed on the bottom 31 of the valve chamber, so as to effectively obstruct with a sealing action. Practically all the height of the cavity thereby sealing the bores 14 and 19 of the valve as it can be clearly seen in the illustration shown in FIG. 4 of the drawings.

Ring 30 is an incomplete ring extending through an angle of slightly less than 270° as shown in FIG. 6, said ring being inserted with a pressure fit in the valve chamber toward the bottom 31 thereof so as to remain firmly supported within the valve chamber thereby serving as a stop for tab 29 of arm 23 of plug 20. In view of the above, when the handle 36 is rotated, the cooperation between tab 29 and the cavity formed by the ring 30 in its incomplete portion, will fix the valve in an open position as shown in FIG. 3 and also in a closed position as shown in FIG. 4 of the drawings.

The extreme positions of tab 29 are shown by means of dotted lines in FIG. 6 of the drawings and it can be clearly seen that plug 20 can be rotated through an angle of 90° automatically giving the accurate open and closed positions of FIGS. 3 and 4.

Plug 20 shows a shoulder 32 receiving a packing member 21 introduced within a cavity of the valve cap 12 threadedly engaged with the upper portion of the valve body 10. When the valve cap 12 is tightened in the opening of valve body 10, the packing member 21 will be pressed so as to perfectly seal the valve stem 10 and the shoulder 32 of plug 20 in order to avoid leakage through the opening through which the stem 11 extends outwardly of the valve, when the latter is in the open position as shown in FIGS. 2 and 3.

The sealing member 26, as illustrated in FIGS. 7 and 8, can also adopt a number of shapes such as that shown in FIGS. 9 and 10, with two enlarged ends 40 and 41 and a depressed web portion 39 which will give a sealing member using less material than that of the embodiment of FIGS. 7 and 8. Regardless of the shape of the sealing member 26, said member is provided with a length slightly larger than the inner diameter of the valve chamber so that said sealing member will be introduced under pressure to achieve a fullproof sealing action against fluid flow through said valve chamber.

In view of the above, the valve of the present embodiment works in a very efficient manner, since it is not provided with parts which can be unduly worn and it does not require any complicated machining of the parts with close tolerances since the sealing member 26 by virtue of being built of an elastomeric material provides for a perfect sealing action without the need of any complicated machining operations.

FIGS. 11 to 15 show other embodiments of the invention which for the sake of clarity will be described as a single embodiment. All similar parts of the valve corresponding to this second embodiment of the invention will be designated by identical reference characters to avoid confusion.

The second embodiment of the invention is very similar to the embodiment already described and the only difference resides in the structure of the sealing means provided within the cavity between arms 22 and 23 of the valve plug, as well as in the valve positioning means to fix the open and closed positions of the valve.

Figure 14:
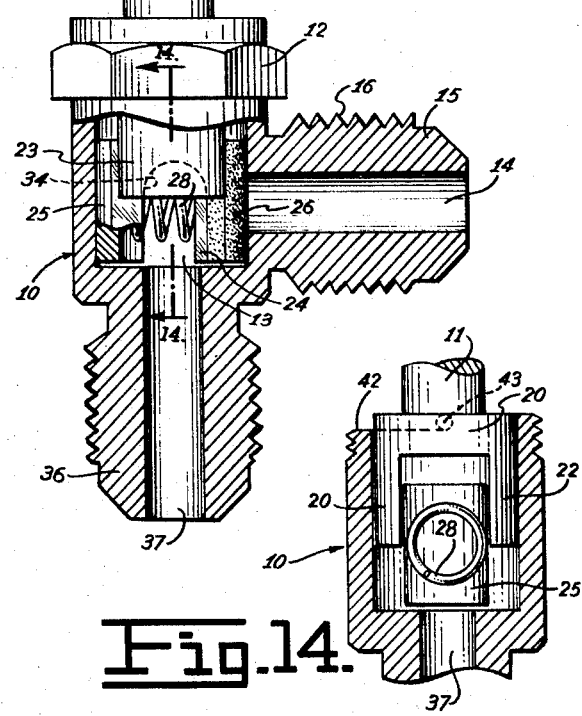
FIG. 14 is a cross-sectional view taken along lines 14-14 of FIG. 13 and looking in the direction of the arrows.
Figure 15:
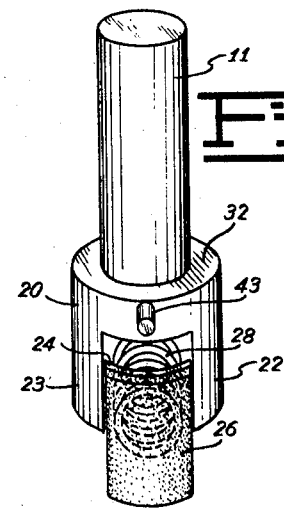
FIG. 15 is a perspective view of the plug member used with the valve built in accordance with the embodiments of FIGS. 11 to 13.

In this particular embodiment of the invention, the valve plug 20 is provided, at the upper portion thereof, with a stub 43 and the valve body 10 is externally threaded at the upper end thereof in order to receive an internally threaded valve cap 12 to press on a packing member similar to that already described. An undercut 42 is provided at the upper threaded end of the valve body 10 as shown in FIG. 14, to cooperate with the stub 43 in order to allow rotation of the valve plug through an angle of 90° between the completely open and the completely closed positions of the valve.

Figure 11:
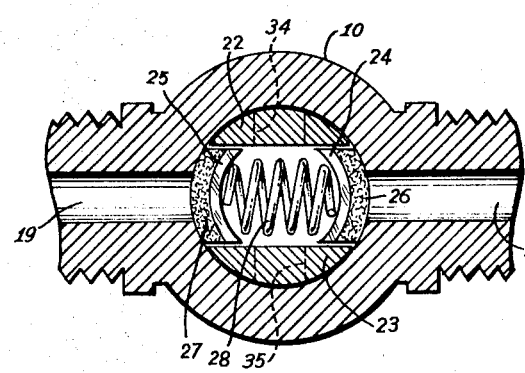
FIG. 11 is a fragmentary cross-sectional plan view of a valve built in accordance with a second embodiment of the invention, the valve being shown in the closed position.
Figure 12:
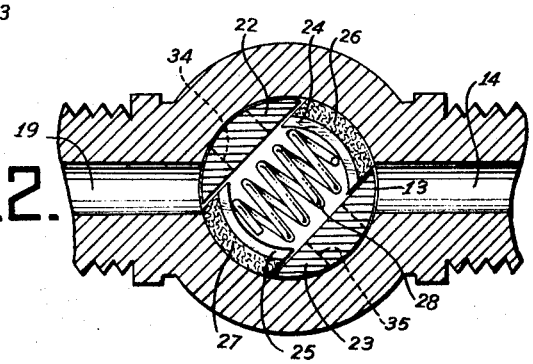
FIG. 12 is a view similar to FIG. 11 but with the valve in a position intermediate the closed and the open positions.

The sealing means in the case of the embodiment according to FIGS. 11 through 15 functions under the same principle as the sealing means of the already described embodiment of FIGS. 1 to 10 and comprises a pair of rigid plates 24 and 25 placed within the cavity formed between the arms 22 and 23 of the plug and biased outwardly by means of a helical spring 28 the ends of which bear against the inner walls of plates 24 and 25. These plates support a pair of members 26 and 27 of any suitable elastomeric material which have a complementary shape in order to sealingly engage the inner wall of the valve chamber 13. Members 26 and 27, by virtue of the action of spring 28, bear on the wall of the valve chamber such that, when the valve is in a position as shown in FIG. 11, the members 26 and 27 seal the bores 14 and 19 avoiding the passage of fluid from one end to the other of the valve.

If desired, it may be convenient to provide circular grooves on the inner walls of plates 24 and 25 in order to accommodate the ends of spring 28 so as to avoid its inadvertent displacement relative to the plates when the valve is operated.

Figure 13:
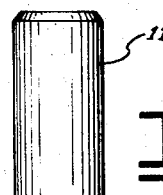
FIG. 13 is a cross-sectional view of a valve built in accordance with a third embodiment of the invention.

This embodiment can also be used with valves of the angular type such as that shown in FIG. 13, wherein one of the bores for the flow of fluids, in this particular case bore 37, is provided in an inlet member 36 extending downwardly from the bottom of the valve chamber 13. In this particular case, it is only necessary to provide one elastomeric member 26 on plate 24 in order to seal, in the closed position of the valve, the bore 14 of the outlet 15. At the other end of spring 28, it is not necessary to provide a member of an elastomeric material, and it is only a metallic plate 25 which is necessary to merely provide a slidable support for spring 28. An undercut 34 may be provided at the ends of each one of the arms 22 and 23 of the bifurcated portion of the valve plug 20, so as to register with the upper portion of bore 15 and allow an unobstructed passage of the fluid from bore 37 to bore 15.

Using the same principle, the valve can be modified to form a T-valve wherein another outlet member can be arranged opposite to member 15, such as member 17, to distribute the fluid toward a pair of lines from a common inlet member 36.

The sealing means used with the valve according to the present invention can have other forms, such as that illustrated in FIG. 16 wherein a pair of elastomeric members 26 and 27 are biased apart from each other by means of a pair of leaf springs 44 and 45 embedded in the body of members 26 and 27 and preferably anchored therein by means of transverse plates joining both leaf springs 44 and 45. This structure, however, is strictly equivalent to the structure of the sealing means of FIGS. 11 to 14 and therefore no further detailed description of its performance is considered necessary.

Finally, the sealing means according to the invention can adopt a form as shown in FIGS. 17 through 19, wherein there is shown a complete hollow cylinder 27 used instead of bore members 26 and 27 and entirely surrounding as a lining all the cylindrical portion of the valve plug 20. A bore 33 is provided similar to bore 33 of the embodiment of FIGS. 1 to 10, and a pair of plates 34 and 35 similar to those already described in the embodiment of FIGS. 11 to 15, act in order to force at least a portion of the elastomeric member 27 toward the cylindrical inner wall of the valve chamber. Any type of spring, as those already described above, can be used to bias plates 24 and 25 radially outwardly of the plug, which are placed within the cavity formed between the arms 22 and 23 of said plug. However, a leaf spring 28 in the form of a yoke is preferably used so as to allow a simpler extracting operation if the valve is to be disassembled. Otherwise, the operative characteristics of this embodiment are exactly the same as those already described for the other embodiments of the invention.

It can be thus seen that a highly improved cock valve has been provided, which is capable of completely avoiding the necessity of complicated and annoying machining operations either on the cylinder or valve plug and on the inner wall of the valve chamber, by virtue of being provided with an elastomeric sealing means of a suitable shape to produce a fullproof sealing action when the valve is in its closed position and to avoid misadjustments produced by the mere mistreatment of the valves, as was the case of all prior art cock valves comprising a pair of metallic members machined with very small gaps.

Another very important advantage of the valve of the present invention resides in the fact that, as the pressure of a fluid grows on the feed line, the elastomeric member sealing the outlet of the valve will be pushed against the outlet opening of the valve, with a force which increases as the pressure exerted thereon by the fluid increases such that the sealing action of the valve is preserved regardless of the pressure of the fluid fed. Therefore, the higher the pressure, the higher the sealing action obtained by the sealing means according to the invention.

Although certain specific embodiments of the invention have been shown and described in the above, it is to be understood that many modifications thereof are possible.

I claim:

1. A cock valve comprising a valve body; inlet and outlet ducts extending outwardly of said body; a cylindrical valve chamber within said valve body; a cylindrical valve plug within said valve chamber; a valve stem for actuating said valve plug; a valve cap closing said valve chamber; a packing member within said valve cap such that said valve cap will act as a packing gland in cooperation with said valve plug and the valve stem, the latter extending outwardly of said valve cap through an opening thereof, said valve plug being a cylinder having an undercut at its lower end so as to form a bifurcated portion and a cavity within said plug bounded by the thus formed bifurcated portion of the plug and by the inner walls of said valve chamber; and yieldable sealing means within said cavity, said yieldable sealing means comprising a solid elastomeric member filling the cavity of said plug, said member having free ends with a contour with a radius of curvature identical to that of the valve chamber, said elastomeric member being of a length slightly larger than the diameter of said valve chamber so as to exert pressure against the inner wall of the valve chamber to effect a sealing action thereagainst, said cylinder and elastomeric member having aligned diametral bores extending perpendicular to the axis of the cylinder such that, when the valve is in the open position, said bores will provide unobstructed communication between the inlet and outlet ducts and, when in the closed position, said bores will be isolated from said ducts and said elastomeric member will yieldably seal at least one of the inlet and outlet ducts to prevent passage of the fluid through the valve.

2. A cock valve according to claim 1 wherein said solid elastomeric member is provided with a centrally arranged depressed portion intermediate the free ends thereof and through which said bore in the elastomeric member passes.

3. A cock valve according to claim 1 comprising a device for indexing and fixing the open and closed positions of the valve, said device comprising an incomplete metal ring having an outer diameter slightly larger than the diameter of said valve chamber and introduced therewithin under pressure to lay directly over the bottom of said valve chamber, said ring spanning an angle slightly less than 270°, the bifurcated portion of said cylindrical plug including a downwardly extending tab to enter into the cavity formed between the incomplete ring and the bottom of the valve chamber, thus serving as a stop for the closing and opening positions of the valve.